June 24, 1930.   F. E. ANDERSON   1,765,858
WHEEL
Filed July 6, 1927
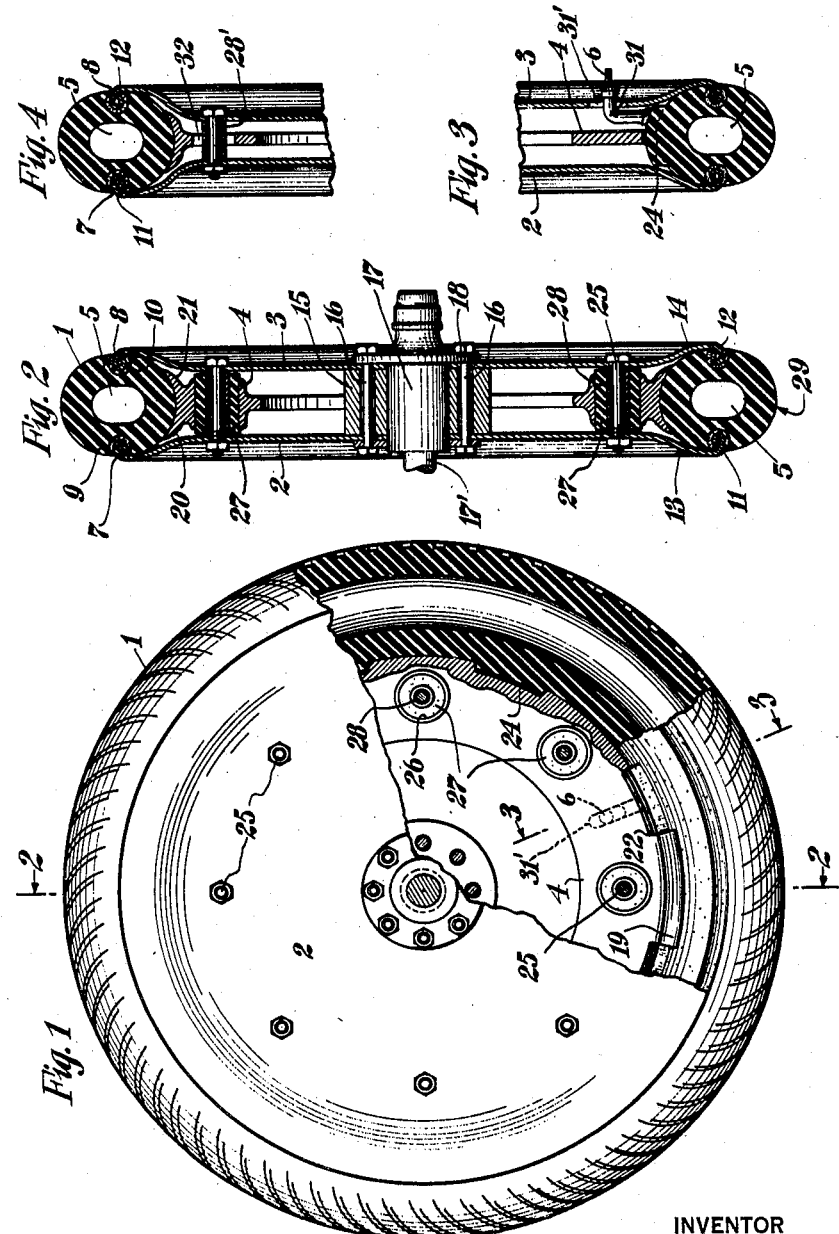
INVENTOR
Frank E. Anderson,
BY
Gustav Drews
ATTORNEY Patented June 24, 1930

1,765,858

UNITED STATES PATENT OFFICE

FRANK E. ANDERSON, OF BROOKLYN, NEW YORK

WHEEL

Application filed July 6, 1927. Serial No. 203,755.

This invention relates in general to an improved automobile wheel.

Among the objects of the present invention it is aimed to provide a wheel having a one-piece combined pneumatic shoe and tire.

Among the objects of the invention it is also aimed to provide a pneumatic tire in which the shock is absorbed not only by the pneumatic tire but also by a floating felloe.

To this end, the present invention specifically contemplates an improved disk wheel embracing two disk members, a one-piece combined pneumatic tire and tube, and a floating felloe in which the shock is absorbed not only by the tire but also by the floating felloe.

These and other features, capabilities and advantages of the invention will appear from the subjoined detail description of specific embodiments of the invention illustrated in the accompanying drawings in which Figure 1 is a side elevation partly broken away of one embodiment of the invention;

Fig. 2 is a section on the line 2—2 of Fig. 1;

Fig. 3 is a fragmental section on the line 3—3 of Fig. 1;

Fig. 4 is a fragmental section of another embodiment of the invention.

The embodiment of the invention illustrated in Figs. 1, 2 and 3 consists essentially of a combined shoe and tube 1, two metal plates 2 and 3 constituting the disks of the wheel, and a floating felloe 4. The combined shoe and tube consists essentially of a rubber annulus having a central annular opening 5 for receiving the air through the valve 6 in the usual way. The sides of the rubber annulus are provided with two annular recesses 7 and 8 lined with fabric in the usual way, as indicated at 9 and 10. The recesses 7 and 8 are adapted to receive the annular beads 11 and 12 formed on the peripheries of the steel plates 2 and 3. The steel plates 2 and 3 have outwardly extending annular portions 13 and 14 at the ends of which the beads 11 and 12 respectively are formed. The beads 11 and 12, in the present instance, consist of portions of the metal plates 2 and 3 rolled over upon themselves.

The central portions of the plates 2 and 3 are preferably spaced from one another by the spacer 15 having a central opening alining with the central openings of the metal plates 2 and 3, and bolt openings alining with the bolt openings in the metal plates 2 and 3 to receive the bolts 16. The central openings of the spacer 15 and plates 2 and 3 are of course provided to receive the shaft 17 of the axle. This shaft 17, in the present instance as shown, is provided with a disk 18, which disk 18 is provided with bolt openings to receive the bolt 16 by means of which the metal plates and spacer, and thereby the wheel, is secured to the shaft 17.

For anchoring the rubber annulus 1 in proper position relative to the metal plates 2 and 3, in the present instance, the felloe 4 serves as the connecting element.

The floating felloe consists essentially of a metal ring provided with an interrupted annular flange 19 embracing laterally extending ring portions 20 and 21 forming with one another a concave arched surface conforming with the convex inner periphery of the rubber annulus 1. The flange 19 is interrupted by recesses 22 to receive the lugs 24 extending from the inner convex periphery of the rubber annulus 1. The length of the lugs 24 corresponds substantially to the length of the recesses 22.

The felloe 4 is anchored to the plates 2 and 3 by the bolts 25. In the present instance, the felloe 4 is provided with a plurality of enlarged openings 26 to receive the rubber bushings 27. The rubber bushings 27 are provided with openings to receive the metal bushings 28 through which the bolts 25 extend. The metal bushings 28, as shown particularly in Fig. 2, are slightly longer than the rubber bushings 27 so that the ends of the metal bushings 28 project beyond the ends of the rubber bushings 27, whereby the ends of the metal bushings 28 engage the plates 2 and 3, while the rubber bushings retain their free resiliency in vertical and transverse direction. The ends of the rubber bushings are shown to project slightly over the edges of the enlarged openings 26. In this way, the felloe 4 when floating laterally will not abut directly against the disks 2 and 3.

The metal bushings 28 and the associated bolts 25 are placed as close to the outer edges of the wheel as practical. Thus the rubber annulus is accommodated between the disks 2 and 3 and the bolts take up the pressure from the inflated tire as well as lateral road pressure, such as incurred when the wheel is caused to turn a curve. A sufficient number of bolts 25 are provided to take up these transverse stresses.

While riding along a straight road will not particularly strain the tire, it is the lateral or transverse stress when turning curves that is apt to considerably reduce the longevity of a tire. It is a feature of the present construction that the tire will effectively meet such conditions. In this respect it will be noted that the floating felloe 4 has lateral clearance between the metal plates 2 and 3. Hence, that portion of the tire which momentarily receives the combined stresses is allowed a local twist or deformation as it pivots around the beads 7 and 8, while the floating felloe between the disks, laterally as well as vertically and in a resilient manner, adjusts itself to such deformation, said disks 2 and 3 all the time being stayed in rigid relation to each other due to the various spacing elements 15, 28, and bolts 16 and 25.

From the foregoing it will be seen that any shock imparted to the tread 29 will initially be partly absorbed by the rubber composition of the tread and the air contents in the chamber 5, and then be transmitted to the rubber bushings 27, the felloe being floatingly mounted on the rubber bushings 27 relative to the metal plates 2 and 3.

It will be seen that the resilient wheel is composed of a minimum of inexpensive and rugged elements which may be quickly and easily assembled to form an efficient and durable unit, presenting desirable smooth, handy and closed outer contours and a minimum of sources for trouble.

An assembler, for instance, may center the rubber annulus together with the floating felloe upon the disk 4 by fitting the head 8 into the corresponding recess of the rubber annulus, and so that the openings in the felloe will register with the bolt holes in the disk. Then the other disk 2 is put in place after the spacer or hub 15 and the bushings 28 are interposed between the two disks 2 and 3. The central openings of the disks now will also register with each other through the intermediary of the recessed rubber annulus. Thereafter, the various bolts 16 and 25 are tightened up to finish the assembly.

Incidentally, the rubber bushings 27 are to play an important part as an expedient in this assembly inasmuch as said rubber bushings will cause the metal bushings to properly register with their prospective bolt holes in said disks 2 and 3. In this way, the bolts 25 may be easily and quickly mounted.

Moreover, the rubber bushings or resilient paddings 27 serve to cooperate with the rubber annulus 1 to furnish a desirable reserve in the resiliency of the wheel. That is to say, the rubber bushings will aid in quickly restoring momentary dislocation of the floating felloe in any direction, in other words, serve to hold the floating felloe resiliently centered with relation to the embracing disks 2 and 3. This means a reserve in addition to the resiliency of the inflatable rubber annulus 1, particularly to be appreciated in the case of a possible blowout of said annulus.

The valve 6, as more particularly shown in Fig. 3, preferably extends through one of the lugs 24 and to one side of the metal felloe 4 and has its angle end 31 project through a slot 31' in one of the metal disks 2 and 3, in the present instance, and preferably in the outer disk 3.

In the embodiment illustrated in Fig. 4, the construction is substantially the same as that illustrated in Figs. 1, 2 and 3, with the exception that the rubber bushings are not used, and instead thereof an annular air space or chamber 32 provided around the metal bushings 28'. This modification exhibits more clearly a specific function of the floating felloe.

As an instance, whatever road pressure is received by the tread surface of the rubber annulus 1 is transmitted to the floatingly supported felloe 4, whereby, as an instance, the portion of the annulus 1 engaged will bulge inwardly adjacent to the portion engaged, such flexture transmitted throughout the rubber annulus 1 in turn to cause the floatingly supported felloe 4 to yield with the annulus 1 relative to the fixed disks 2 and 3.

The felloe in this combination therefore serves to cooperate with the annulus 1 in transmitting the resulting strains from the pressure throughout the annulus 1.

In the two embodiments illustrated, the recesses 7 and 8 preferably have diminished mouths in order securely to clamp the beads 11 and 12 in place.

It is obvious that various changes and modifications may be made to the details of construction without departing from the general spirit of the invention as set forth in the appended claims.

I claim:

1. In a wheel, the combination with a rubber tread annulus having an annular air compartment, of metal disks, and a one piece annular metal felloe anchored to said annulus and floatingly supported by and between said disks, said disks extending to and alongside of said tread to cooperate with said felloe to secure said tread in operative relation to said felloe.

2. In a wheel, the combination with a rubber annulus having an annular air chamber and an air valve communicating with said air chamber for supplying pressure in said chamber, of metal disks connected to the sides of said annulus at their peripheries, and an annular felloe anchored to said annulus and floatingly supported by and between said disks.

3. In a wheel, the combination with a rubber annulus having a centrally disposed annular air chamber, there being a medially disposed annular recess in each side of said annulus, of two metal disks, each metal disk having an annular bead at its periphery to engage one of the annular recesses in said annulus, a spacer secured to said disks to space said disks from one another with said annular beads in anchoring engagement with said annular recesses, and a felloe floatingly anchored between said disks and in engagement with said rubber annulus.

4. In a wheel, the combination with a rubber annulus having an inflatable air chamber, of metal disks embracing the sides of said annulus, an annular felloe to fit said annulus and having lateral clearance with said disks, there being enlarged openings in said felloe, metal bushings extending through said openings and between said disks, bolts extending through said metal bushings and connected to said disks, and rubber bushings mounted in said openings and supporting said metal bushings between said disks, the ends of said metal bushings extending beyond the ends of said rubber bushings, the ends of said rubber bushings extending beyond the edges of said openings, said rubber bushings effective for limited vertical as well as transverse floatability of said felloe so that the latter may adjust itself to the deformations of the rubber annulus at the point of road contact when the wheel suffers lateral pressure while turning a curve.

FRANK E. ANDERSON.